June 4, 1935.  J. J. HASKIN  2,003,535
FISH POLE HOLDER
Filed Sept. 23, 1933
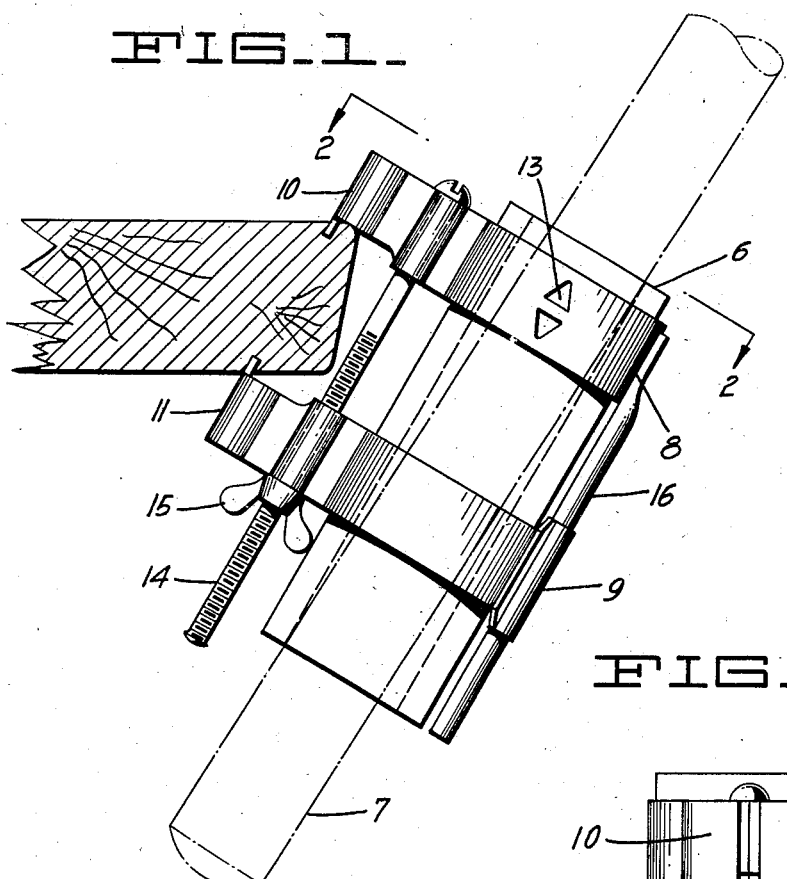
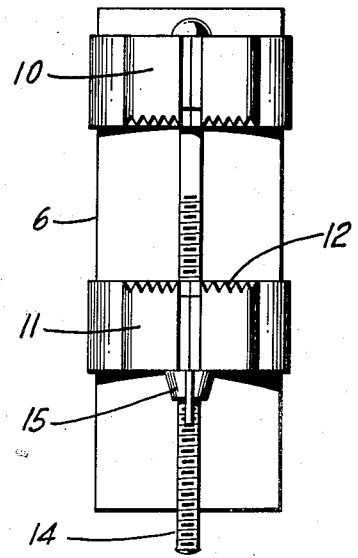
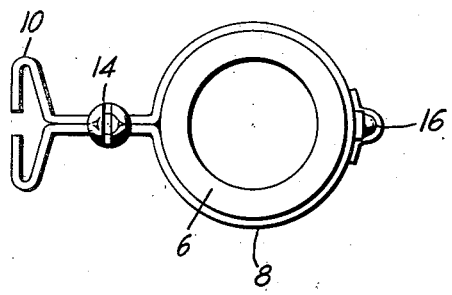
INVENTOR.
Joseph J. Haskin
BY
ATTORNEY.

Patented June 4, 1935

2,003,535

UNITED STATES PATENT OFFICE 2,003,535

FISH POLE HOLDERS

Joseph J. Haskin, Oakland, Calif.

Application September 23, 1933, Serial No. 690,697

7 Claims. (Cl. 248—41)

This invention relates to a device particularly useful as a fish pole holder. Fishermen are troubled, when trolling or bait fishing, by the lack of any suitable means for holding the fishing pole. Frequently the pole is insecurely positioned with the result that it falls over and breakage of the reel or of the agate guides results. The device of the present invention has been developed after considerable effort and much practical experience has gone into its achievement. It enables a fish pole to be readily positioned in a secure manner, one in which the pole can not fall over or be accidentally knocked down, while permitting the ready removal of the pole for handling of fish if such a fortunate occasion arises.

It is generally the object of the present invention to provide an improved and novel fish pole holder, particularly one very simple in construction and inexpensive to manufacture.

The invention possesses numerous other advantageous features and objects, some of which, together with the foregoing, will appear in the following, wherein the preferred form of fish pole holder of my invention will be set forth.

In the drawing accompanying and forming a part of this specification, I have shown the preferred form of fish pole holder, as is required by statute. However, it is to be understood that various modifications may be made therein without departing from the spirit of my invention as it is defined in the claims.

In the drawing,

Figure 1 is a side elevation of a fish pole holder of my invention.

Figure 2 is a plan view in the direction of the line 2—2 in Figure 1.

Figure 3 is a rear view of the device, showing the support engaging means.

As appears in the drawing, I provide a tubular member 6, which is of such a size that it can pass readily the butt end 7 of a fish pole. This tubular member is preferably of a resilient and flexible construction and I have successfully used a length of rubber hose. The internal diameter of the hose is such that the butt end of the pole can be inserted readily while the pole, when placed at a slight angle, engages the opposite edges of the hose, as appears in Figure 1, so that the pole is secure. The hose is usually positioned at a slight angle to the vertical so that the pole is engaged and held securely. If desired, the hose can be positioned vertically and the pole permitted to drop through the hose until the reel, or some other portion of the pole, engages the hose and retains the pole.

To support the resilient member, suitable support engaging means are provided. In the form shown in the drawing, these comprise an upper member 8 and a lower member 9 formed of strap iron to extend above the hose and provide respectively support engaging means 10 and 11. Each of these support engaging means, in the preferred form shown in the drawing, include teeth 12 which engage a support to retain in position the resilient member 6. The upper member 8 is usually secured to the hose by struck-out portions 13 which engage the hose and retain the member 8. The lower member 9 is slidable along the hose so that various supports can be made use of. To secure the support engaging means 10 and 11 in engagement with the support, a threaded rod 14 is secured to the upper member 8 and extends through the lower member 9 so that a wing nut 15 can draw the two members together. A guide rod 16 is fastened to the upper member 8 and provides a suitable guide for movement of the lower member 9 toward and away from the upper member 8. The guide rod can be secured to the upper member 8 by spot welding, if desired, and the members 8 and 9 are usually secured together by riveting or spot welding, so that the whole construction is simple and inexpensive.

If desired, the hose 6 can be made in two short sections, one section being secured to the upper member 8 and the other section secured to the lower member 9 so that less hose is needed. However, that structure shown in the drawing has proven satisfactory in use and provides, at the present time, the preferred structure.

I claim:

1. In a device of the character described, a tubular member of resilient material and construction, clamp means secured to said member adjacent an end thereof, other clamp means movable relative to said first mentioned clamp means, a threaded guide rod extending from said first mentioned clamp means and through said other clamp means, and a nut on said rod for drawing said clamp means together to engage a support.

2. In a device of the character described, a length of rubber hose, a first member extended about said hose and having support engaging means thereon, a second member extended about said hose and having support engaging means thereon to cooperate with the support engaging means on said first member, and means for securing said members to engage a support.

3. In a device of the character described, a length of rubber hose, a first member extended about said hose and having support engaging means thereon, a second member extended about said hose and having support engaging means thereon to cooperate with the support engaging means on said first member, and a threaded member for drawing said members together and for securing said members to engage a support.

4. In a device of the character described, a pair of cooperatively spaced support engaging members, means for securing said members in engagement with a support, and a length of rubber hose providing a flexible and resilient fish pole holder positioned by said support engaging members.

5. A holder for a fish pole having a butt, the holder comprising a length of rubber hose of an internal diameter sufficient to pass freely the butt of the fish pole, a first support element secured to said hose adjacent one end thereof, and a second support element slidable along said hose and guided thereby to cooperate with said first element to engage a support.

6. A holder for a fish pole having a butt, the holder comprising a length of rubber hose of an internal diameter sufficient to pass freely the butt of the fish pole, a first support element secured to said hose adjacent one end thereof, a second support element slidable along said hose and guided thereby to cooperate with said first element to engage a support, and a member secured to one of said supports and slidably engaging the other support to prevent relative rotation between said supports.

7. A holder for engaging a fish pole butt to support said pole, said holder comprising a length of rubber hose, and means for positioning said hose in a generally upright position, said hose having an internal diameter larger than said pole butt whereby said pole butt upon insertion into said hose and tilting engages opposite faces of said hose and is supported upon said engagement in a tilted position.

JOSEPH J. HASKIN.